UNITED STATES PATENT OFFICE.

HARRY C. PARKER, OF WILMINGTON, DELAWARE.

COMPOSITION FOR CLEANING, BLACKING, AND OILING OF LEATHER.

SPECIFICATION forming part of Letters Patent No. 365,854, dated July 5, 1887.

Application filed September 7, 1886. Serial No. 212,914. (No specimens.)

*To all whom it may concern:*

Be it known that I, HARRY C. PARKER, a citizen of the United States, residing at Wilmington, in the county of New Castle and State of Delaware, have invented a new and useful Composition of Matter to be Used for the Cleaning, Blacking, and Oiling of Leather, of which the following is a specification.

My composition consists of the following ingredients, combined in the proportions stated, viz: pure water, ten quarts; bichromate of potash, two ounces; prussiate of potash, two ounces; neat's-foot oil, one pint; Germantown lamp-black, one-half pound; Acme soap, seventeen bars; castile-soap, one pound—the Acme and castile soap to be finely shaven and boiled in the water until no lumps are seen. Then add other ingredients, and stir till thoroughly mixed. Then pour in pans for cooling. The bichromate and prussiate of potash serve to harden the soap and fix the color. The "Acme" soap used as one of the ingredients is a well-known article of commerce, and its composition is believed to be a secret known only to its manufacturers. It is more perfectly adapted to the purpose for which it is here employed than any other ingredient. The bars in which it is sold each weigh one pound. "Germantown lamp-black," so called, is preferred, as it is the purest lamp-black in the market.

In using the above-named composition, the leather should first be freed from all impurities by washing in clear water.

By using the above composition the leather, however hard and dry, is given a new-like luster and made soft and pliable.

I am not aware that all the ingredients of my composition, in the proportions stated, have been used together.

What I claim, and desire to secure by Letters Patent of the United States, is—

The herein-described composition of matter, to be used for oiling, blacking, and cleaning leather, consisting of water, bichromate of potash, prussiate of potash, neat's-foot oil, Germantown lamp-black, Acme soap, and castile-soap, in the proportions specified.

HARRY C. PARKER.

Witnesses:
 THOS. DAVIS,
 GEO. C. WARD.